United States Patent
Dima et al.

(10) Patent No.: US 10,757,859 B2
(45) Date of Patent: Sep. 1, 2020

(54) SYSTEM FOR OPTIMIZING PLATFORM SETTINGS BASED ON CROP STATE CLASSIFICATION

(71) Applicant: Deere & Company, Moline, IL (US)

(72) Inventors: Cristian Dima, St. Ingbert/Rohrbach (DE); Dohn W. Pfeiffer, Bettendorf, IA (US); Dirk Weichholdt, Woelfling les Sarreguemin (FR); Martin Bueermann, Beckingen (DE)

(73) Assignee: Deere & Company, Moline, IL (US)

( * ) Notice: Subject to any disclaimer, the term of this patent is extended or adjusted under 35 U.S.C. 154(b) by 321 days.

(21) Appl. No.: 15/801,944

(22) Filed: Nov. 2, 2017

(65) Prior Publication Data

US 2019/0021226 A1     Jan. 24, 2019

Related U.S. Application Data

(60) Provisional application No. 62/535,043, filed on Jul. 20, 2017.

(51) Int. Cl.
| | |
|---|---|
| *A01D 41/14* | (2006.01) |
| *A01D 41/127* | (2006.01) |
| *A01D 34/00* | (2006.01) |
| *A01D 34/04* | (2006.01) |
| *A01D 34/28* | (2006.01) |

(Continued)

(52) U.S. Cl.
CPC ......... *A01D 41/141* (2013.01); *A01D 34/006* (2013.01); *A01D 34/008* (2013.01); *A01D 34/04* (2013.01); *A01D 34/283* (2013.01); *A01D 41/127* (2013.01); *G06K 9/00791* (2013.01); *G06K 9/66* (2013.01); *A01D 34/14* (2013.01); *A01D 57/12* (2013.01); *A01D 61/002* (2013.01); *A01D 69/03* (2013.01)

(58) Field of Classification Search
CPC .... A01B 69/008; A01D 34/006; A01D 34/04; A01D 34/243; A01D 47/00; A01D 41/141; A01D 41/1275; A01D 41/1278; A01D 57/04; G06K 9/166; G06K 9/00791
USPC .......................... 56/10.2 E, 10.2 R, 220, 221
See application file for complete search history.

(56) References Cited

U.S. PATENT DOCUMENTS

| | | | | |
|---|---|---|---|---|
| 4,124,970 A | * | 11/1978 | Bernhardt | A01D 41/141 56/10.2 E |
| 4,211,057 A | * | 7/1980 | Dougherty | A01D 41/141 56/10.2 E |

(Continued)

FOREIGN PATENT DOCUMENTS

| | | |
|---|---|---|
| DE | 102017208442 A1 | 11/2018 |
| EP | 0960558 A1 | 12/1999 |

(Continued)

OTHER PUBLICATIONS

Search Report issued in counterpart application No. EP18183166.0, dated Dec. 11, 2018 (6 pages).

*Primary Examiner* — Robert E Pezzuto

(57) ABSTRACT

A system for controlling an operative parameter of a harvesting platform of an agricultural harvesting machine comprises a sensor adapted to provide downed crop information indicative of a characteristic of downed crop in a field to be harvested and an electronic control unit adapted to control an operative parameter of at least one of a reel and a cutter bar table position of the harvesting platform based upon the downed crop information.

12 Claims, 2 Drawing Sheets

(51) Int. Cl.
*G06K 9/00* (2006.01)
*G06K 9/66* (2006.01)
*A01D 34/14* (2006.01)
*A01D 57/12* (2006.01)
*A01D 61/00* (2006.01)
*A01D 69/03* (2006.01)

(56) References Cited

U.S. PATENT DOCUMENTS

| | | | | |
|---|---|---|---|---|
| 5,299,413 | A * | 4/1994 | Gale | A01D 41/06 56/10.2 E |
| 6,195,972 | B1 * | 3/2001 | Talbot | A01D 57/04 56/220 |
| 6,616,570 | B2 | 9/2003 | Wakashiro et al. | |
| 6,651,411 | B1 * | 11/2003 | Becker | A01D 57/04 56/10.2 A |
| 8,333,057 | B2 * | 12/2012 | Schroeder | A01D 41/141 56/10.2 E |
| 2006/0213168 | A1 | 9/2006 | Remillard | |
| 2017/0082442 | A1 | 3/2017 | Anderson | |

FOREIGN PATENT DOCUMENTS

| | | | |
|---|---|---|---|
| EP | 2517549 | A1 | 10/2012 |
| EP | 2681984 | A1 | 1/2014 |
| EP | 2803257 | A1 | 11/2014 |
| GB | 2173309 | A | 10/1986 |
| WO | 2003049532 | A1 | 6/2003 |
| WO | 2014023632 | A1 | 2/2014 |

\* cited by examiner

SYSTEM FOR OPTIMIZING PLATFORM SETTINGS BASED ON CROP STATE CLASSIFICATION

This invention relates generally to agricultural harvesting machines. More particularly it relates to control of work parameters of a reel and/or a cutter bar table position of a platform header of the harvesting machine.

BACKGROUND

Agricultural harvesting machines are designed to harvest crops. They have headers designed to cut or collect crops from the ground, which are then processed in the body of the harvesting machine, or directly deposited on the ground. In case of a combine, the harvesting machine threshes the crops, separates the grain from material other than grain (MOG), cleans the grain, and stores the grain in a grain tank. Eventually, they transfer the grain from the grain tank to an accompanying vehicle such as a grain cart or grain wagon. In case of a forage harvester, the crop is cut, accelerated and blown into a container of a transport vehicle, and in case of a windrower, the crop is cut and deposited on a field in a swath.

A typical header of a combine for harvesting small grain like wheat or barley is a so-called platform, which comprises a knife bar, a reel and a transverse conveyor. The knife bar cuts the stalks of the crop from the roots remaining in the ground, and the transverse conveyor, which can be an auger or a belt conveyor, feeds the crop transversely to the feederhouse which on its end feeds it into the interior of the combine harvester for threshing and further processing. The reel is located above the knife bar and rotates to engage with fingers into the crop to feed the crop rearwardly such that it can be cut by the knife bar. The cut crop is conveyed to the rear by at least one of the reel fingers and subsequently harvested crop until it is engaged by the transverse conveyor. Such a platform header can also be used on a forage harvester for providing silage of entire grain plants and on a windrower.

A number of automations of work parameters of platforms, which had to be controlled in the past manually by the harvesting machine operator, have been proposed. For example, the position of the header over ground and thus the cutting height can be controlled automatically based on sensors in a ground-contour following manner (U.S. Pat. No. 6,616,570 B2).

Another possible adjustment of some embodiments of platform headers is the table length, i.e. the distance between the knife bar and the transverse conveyor in a length-variable platform. It was proposed to control the table length automatically dependent on the crop height (WO 2014/023632 A1).

A further work parameter of a cutting platform of a combine to be controlled is the reel position. It was proposed to sense the position of the top of the crop with an ultrasonic sensor (GB 2,173,309 A) or with a camera (EP 2,681,984 A1) or with a combined RADAR and LIDAR sensor (EP 2,517,549 A1) and to adjust the vertical reel position (and in the case of EP 2,517,549 A1, also the reel speed and horizontal position) accordingly. While this automatic control allows adapting the reel parameters automatically to longer or shorter crop stalks, it will not work in a satisfactory manner in the case that (for example due to strong wind) downed crop is to be harvested, since in this case, the reel position for optimal crop collection depends also on the orientation of the downed crop, which cannot be detected by the mentioned sensors. In this case, manual control is thus still required.

It was proposed to sense the orientation of downed crop on a field based on texture or length of image segments with optical sensors provided on an unmanned aerial vehicle or on a harvesting machine in order to control the harvesting direction of the latter opposite to the lodging direction and to control harvester speed, header height and header orientation based upon lodging magnitude and direction (US 2017/0082442 A1). This proposal, however, offers no assistance to the operator in adjusting the reel control or cutter bar table position.

It is an object of this invention to provide an automatic platform header control system enabling collection of downed crop.

SUMMARY

According to one embodiment the invention, a system for controlling an operative parameter of a harvesting platform of an agricultural harvesting machine is provided, comprising a sensor adapted to provide downed crop information indicative of a characteristic of downed crop in a field to be harvested; and an electronic control unit adapted to control an operative parameter of at least one of a reel and a cutter bar table position of the platform based upon the downed crop information.

The characteristic of downed crop can be at least one of the orientation and lodging magnitude (i.e. relative amount of downed crop across the cutting width of the platform) in the field.

The operative parameter of the reel can be at least one of vertical reel position, horizontal reel position and reel speed.

The electronic control unit can be adapted to automatically control additionally at least one of cut height of the platform, platform fore-aft tilt and harvesting machine propelling speed based upon the downed crop information.

The electronic control unit can be adapted to control the cutter bar table position of the platform based on a sensed crop height above ground and the harvesting platform actual cutting height of the platform such that the distance between a knife bar and a transverse conveyor of the platform at least approximately corresponds to the difference between the sensed crop height above ground and the actual cutting height of the platform. This adjustment thus adapts the cutting table length (which is the distance between the knife bar moved fore and aft by the actuator controlled by the automatic system and the transverse conveyor) to the length of the cut crop (instead of the length of the standing crop, as described in the prior art WO 2014/023632 A1) and provides optimal feeding through the platform. The downed crop detection is not necessarily required for this embodiment, although (in case of downed crop detection) it operates best in case that the downed crop information is indicative of standing crop.

The electronic control unit can be adapted to control the cutter bar table position of the platform in case that the detected downed crop is directed towards the platform, to have a table length (which is the distance between the knife bar moved fore and aft by the actuator controlled by the automatic system and the transverse conveyor) somewhat longer than the difference between a sensed crop height above ground and the actual cutting height of the platform, while in the opposite case, the table length is relatively short or as short as possible.

The sensor can comprise a single (monocular) camera and an image processing system or two cameras together providing 3-dimensional image information of the crop on the field and an image processing system. Instead of or additional to one or more optical cameras, a time-of-flight sensor (scanning LIDAR or 3d photon mixer camera) be used. The sensor can be mounted on the platform, on the harvesting machine (in particular on the cab) or on an unmanned aerial vehicle (UAV) which can be tethered to the harvesting machine or untethered.

The sensor can be connected to a learning-based image processing system, which is operable (a) in a learning mode in which it receives a sample image and human-generated classifications of image areas and learns the relation between the image and the classifications and (b) in an executive mode in which it applies the learned relation to one or more captured images.

The electronic control unit can be adapted to position the reel directly above a knife bar of the platform and in horizontal direction such that fingers of the reel engage the ears of the crop and to set the reel rotation speed set such that crop is slightly accelerated into the platform in case that the sensor senses standing crop.

The electronic control unit can be adapted, in the case that the sensor senses downed crop, to move the reel forward and down ahead of a knife bar of the platform to lift the downed crop and to drive the reel with approximately 120% of ground speed and optionally lower the knife bar of the platform is lowered and adjust it parallel to the ground if the ears of the crop are leaning forward in the direction of travel, while if the ears of the crop are lying towards the platform, the knife bar of the platform is lowered and adjusted parallel to the ground.

An agricultural harvesting machine can comprise a chassis, ground engaging means supporting the chassis on the ground, attachment means for adapting a harvesting platform on the chassis, and a system as described above.

The harvesting machine can be one of a combine, a forage harvester and a windrower.

DETAILED DESCRIPTION

Harvesting Machine

Figure 1:
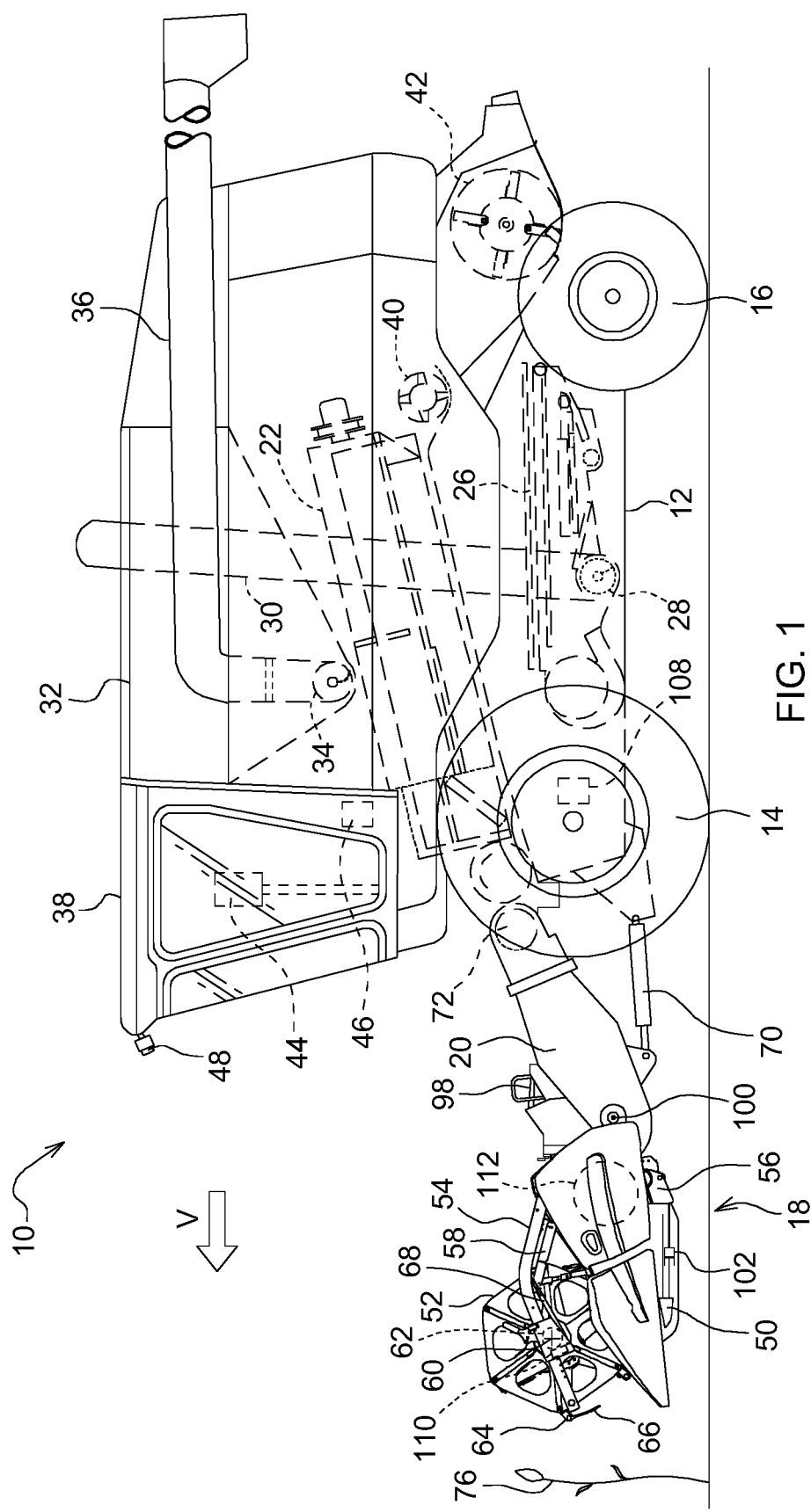
FIG. 1 is a schematic side view of an agricultural harvesting machine.

The terms "downed crop" and "lodged crop", both refer to crop plants that have their stalks bent or broken, for example due to high winds, rain, hail, or the like. These forces bend or break the stalks the crop plants and causes the plants to have a bent-over and non-vertical orientation. The term "downed crop" is used herein to describe this phenomenon FIG. 1 shows a self-propelled harvesting machine 10 in the form of a combine, having a supporting chassis 12 that is supported on driven front wheels 14 and steerable rear wheels 16 on the ground and moved forward by the wheels 14, 16. The wheels 14, 16 are set into a rotating motion by drive means (not shown) in order to move the harvesting machine 10 over a field to be harvested. In the following, direction references, like forward or rear, refer to the forward direction V of the harvesting machine 10, which is directed towards the left in FIG. 1.

On the forward end area of the harvesting machine 10, a harvesting header in the form of a harvesting platform 18 is releasably mounted, in order to harvest standing crop 76 in the form of grain or other threshable stalk fruit from the field and to convey it upwardly and rearwardly through a feederhouse assembly 20 to an axial threshing assembly 22 during the harvest operation. The mixture of grain and other material, which penetrates through threshing concaves and separation grates of the axial threshing assembly 22 reaches a cleaning device 26. Grain cleaned by the cleaning device 26 is conveyed by a grain auger six to a grain elevator 30 feeding it into a grain tank 32. The clean grain in the grain tank 32 can be unloaded by an unloading system comprising a transverse auger 34 and an unloader conveyor 36 arranged as an auger assembly. The crop residues expelled by the axial threshing assembly 22 are fed by means of a beater 40 to a straw chopper 42 which chops and distributes them over the platform width over the field. The mentioned systems are driven by an internal combustion engine and are controlled by an operator from an operator's cab 38. The shown axial threshing assembly 22 with one or more axial threshing and separating rotors is merely an exemplary embodiment and could be replaced by a tangential threshing arrangement with one or more threshing drums and subsequent straw walkers or separation rotors.

Platform

The platform 18 comprises a reciprocating knife bar 50 extending generally over the entire width of the platform 18. The knife bar 50 can be rigid or flexible, as known in the art. A reel 52 is positioned on the platform 18 and also extends generally over the entire width of the platform 18 (or a part thereof). The outer ends of the reel 52 are supported on arms 54, of which only one is shown in FIG. 1. The arms 54 have rear ends which are supported around axes extending transversely to the forward direction "V" on the frame 56 of the platform 18, which frame 56 also extends over the width of the platform 18, and extend from there towards the front. Each arm 54 is coupled to an actuator 58 in form of a hydraulic cylinder, which is pivotally supported on the frame 56 and on the arm 54. The arms 54 and thus the reel 52 are lifted and lowered by adjusting (retracting and extending) the actuator 58.

On a central tube 62 that can be set into a rotation motion (during harvest operation, in the counter-clockwise direction about a rotational axis 60 in FIG. 1) by a controllable drive 110, tine carriers 64 are supported, extending also over the width of the platform 18 (or a part thereof), on which tine carriers 64 fingers 66 are mounted. A second actuator 68 in form of a hydraulic cylinder is adapted for a horizontal adjustment of the reel 52 by moving a support bearing of the tube 62 along the arm 54. The platform 18 also comprises a transverse conveyor 112, which can be arranged as an auger (as shown) or conveyor belts, in order to feed the crop cut by the knife bar 50 to the center of the platform 18 and to feed it into the feederhouse assembly 20 through a rear opening in the frame 56. The height of the platform 18 over ground is defined by a third actuator 70 (controlled by means of the electronic control unit 46 based upon input from the user input device 44 and/or an automatic control, the electronic control unit 46 adapting the platform height to the ground contour, keeping the platform 18 at the desired height over ground or guiding it with a desired pressure on the ground) which pivots the feederhouse assembly 20 and thus the platform 18, which is removably mounted thereon, around a horizontal axis 72 extending transversely to the forward direction with respect to the chassis 12 of the harvesting machine 10. As known in the art, the platform 18 can pivot around a horizontal, forwardly extending axis (lateral tilt) to follow the ground contour, normally moved by another actuator (not shown) that is controlled by the electronic control unit 46.

Platform Operation

In the state of the art, the height adjustment of the reel 52 is performed by an operator, who is provided with a user input device 44 with keys in his cab 38. The user input device 44 is connected to an electronic control unit 46 which on its end controls the actuator 58. If the operator depresses an upper key of the user input device 44, the reel 52 is lifted, while it is lowered, as long as the operator depresses a lower key of the user input device 44. While harvesting standing crop 76, the operator will position the reel 52 in the horizontal direction (by means of additional keys of the user input device 44, which control the second actuator 58 via the electronic control unit 46) with a small space in front of the knife bar 50 of the platform 18.

The vertical height of the platform is adjusted by an operator normally in a manner such that the fingers 66 of the reel 52 engage into the stalks of the standing crop 76 somewhat below the ears. If the reel 52 is adjusted too high, standing crop 76 can collected on the knife bar 50. At correct reel height, the knife bar 50 can cut the standing crop 76 without problems and the plant stalks fall with the ears in front to the transverse conveyor 112. The forward position of the reel 52 depends on the respective yield, i.e. the reel 52 is moved at high throughputs further to the front and vice versa. When harvesting downed crop, the reel 52 needs to be vertically and in difficult conditions also horizontally closer to the knife bar 50 in order to feed the plants into the direction of the knife bar 50 and subsequently to the transverse conveyor 112. In the case that downed crop needs only to be harvested over a part of the width of the platform 18, while standing crop comes in over the remaining width, a very low reel position results in poor crop flow and to losses in the standing grain. In this case, an intermediate position is used in order to harvest both the downed crop as also the standing stalks in a reasonable fashion.

Also, in case that platform 18 has a variable cutting table length, it can be useful to adjust this length in case that the crop height varies or downed crop is to be harvested, as described below. It is thus obvious that the continuous manual adaption of the reel position and/or cutting table length to the actual crop conditions is a task fatiguing the operator, which can at the latest after some hours not more been performed in an optimal manner, resulting in non-optimal harvesting results.

Automatic Platform Adjustment

Figure 2:
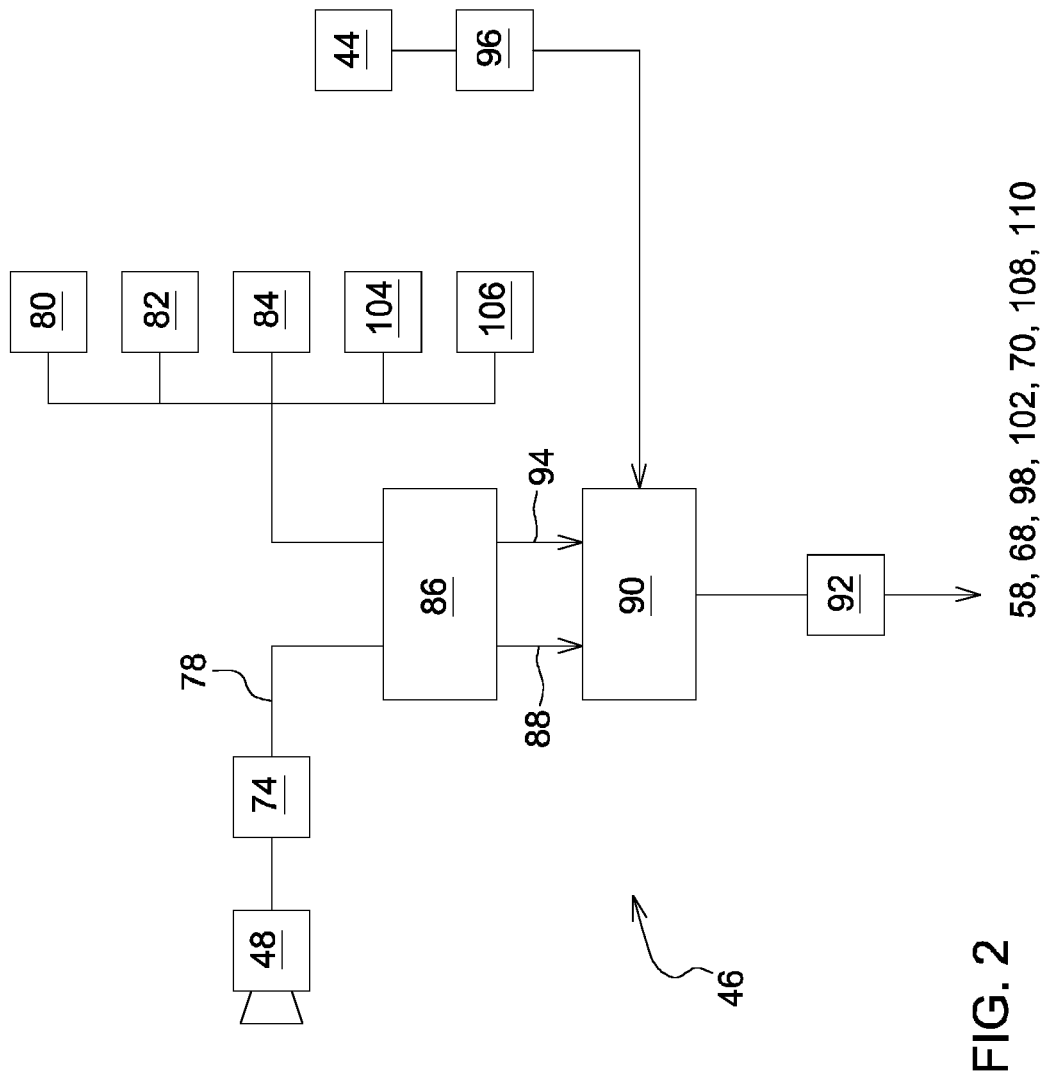
FIG. 2 is a schematic diagram of the system controlling work parameters of the platform operation of the harvesting machine of FIG. 1.

In order to make work for the operator easier and to relieve him or her from the continuous adjustment of the position of the reel 52 and the cutting table length, the harvesting machine 10 is provided with a system for an automatic adjustment of operating parameters of the reel 52, shown schematically in FIG. 2. The system comprises a sensor 48 arranged as a monocular or stereo camera with an image processing system 74. The camera looks onto the standing (or possibly downed) population of the crop 76 in front of the platform 18. The image processing system 74 analyses the image signals of the camera and outputs signals 78 during operation that represent the height of the upper surface of the standing crop 76 over ground. This signal 78 is used for controlling reel position and speed in a manner such that the position and speed of the reel 52 are set to appropriate values when the reel 52 interacts with the crop 76 at the position at which the sensor 48 has produced the signal 78.

Additionally, the rotational speed of the reel 52 defined by the controllable drive 110 can be controlled manually or automatically.

A number of feedback sensors 80, 82, 84 sense the position of the actuators 58, 68, 70. The feedback sensors 80 to 84 can detect the position of the actuators 58, 68, 70 per se (directly), i.e. be arranged as optical or magnetic sensors which interact with the rod of the actuators 58, 68, 70, or they sense the translational or rotational position of an element moved by the actuator 58, 68, 70, for example of the arm 54 around its rear rotational axis.

The signals of the sensor 48 and the signals of the feedback sensors 80 to 84 are submitted to a signal processing unit 86 which is a part of the electronic control unit 46 and calculates, based upon the known geometry of the platform 18 and of the harvesting machine 10 including the feederhouse assembly 20 and the signals provided by the feedback sensors 80 to 84 in which height over ground a reference point of the reel 52 is located. If the platform 18 can be moved by an additional actuator 98 (controlled via the user input device 44 and the electronic control unit 46) around a horizontal axis 100 transverse to the forward direction V, which can be coincident with the lower feederhouse roller, the position of the additional actuator 98 would be detected by another feedback sensor 104 and be considered by the signal processing unit 86. The mentioned reference point can be for example the lower end of a finger 66 which is actually in its most forward position, like the finger 66 in FIG. 1. This height is subtracted from the height of the top surface of the standing crop 76 which is known from the signal 78. The signal processing unit 86 can comprise a low-pass filter in order to reduce the noise in the output signal 88, which represents a sensed vertical distance between the reference point of the reel 52 and the top surface of the crop 76.

The horizontal position of the knife bar 50 with respect to the frame 56 of the platform 18 is adjustable by an actuator 102, which is controlled via the user input device 44 and the electronic control unit 46. Possible embodiments of a platform with a moveable knife bar are shown in EP 2,803,257 A1 and WO 03/049532 A1, the contents of which incorporated herein by reference for all that they teach. This adjustment allows to adjust the cutting table length to the particular crop type and, if appropriate, to the direction of downed crop. A feedback sensor 106 senses the position of actuator 102 directly or indirectly.

The output signal 88 is fed to an electronic processing unit 90, which also receives the signals from the user input unit 44 via a signal shaper 96 and provides, via a control unit 92, control signals to actuators 58, 68, 98 and 102. According to a preferred embodiment, the signals received from the user input unit 44 are only used for overriding actuator settings which are adjusted automatically based on signals from sensor 48.

Downed Crop Detection

The signal processing unit 86 provides, additionally to the output signal 88 indicating the difference between the height of the reference point of the reel 52 and the top surface of the crop 76, a second output signal 94 indicating the width of downed crop in front of platform 18 and the dominating direction of the downed crop stalks. The images captured by the stereo camera of the sensor 48 are hence analyzed by the image processing system 74 in order to extract downed crop properties (e.g. but not limited to crop status like standing, down, partially down, stubble, missing crop, and (optionally, in particular in combination with a 3d-detection) standing or downed crop height) and downed crop orientation relative to the forward direction V of the harvesting machine 10 (e.g. but not limited to "sideways", "towards the machine", "away from the machine" or "random orientations"). These crop properties and/or orientations are used to optimize settings or operation parameters of the harvesting machine 10 and platform 18 such as (but not limited to) reel position (fore-aft/height), cut height, cutter bar table position, header fore-aft tilt, and reel speed as well as the harvesting machine forward speed, which are adjusted for optimally picking up the crop 76 in the given conditions.

The usage of image analysis to derive crop orientation enables superior strategies for picking up the downed crop and adjusting the propelling speed of the harvesting machine 10 in order to minimize grain losses compared to previously described methods, which rely only on detection of downed crop or crop height estimation but do not use orientation information. By determining what the overall amount and the dominant orientation of the downed crop is ahead of the harvesting machine 10, one can use (for example) different harvesting machine speeds, reel and header settings for harvesting downed crop that is oriented towards the machine as opposed to downed crop that is oriented laterally relative to the machine. The ability to distinguish between the different classes of downed crop orientation is a key advantage over the state of the art. It allows much finer control and optimization of the header and reel settings in addition to controlling the reel height (actuator 58), including control of the reel fore-aft position (actuator 68), the reel speed (controllable drive 110), control of the header height set point (actuator 70), the header fore-aft tilt (actuator 98), and cutter bar table position (actuator 102). Also, the propelling speed of the harvesting machine 10 can be controlled by means of an actuator 108.

The system can be implemented with a sensor 48 using one or more stereo or monocular cameras. Using 3-D information (such as measurements provided by a laser range finder, a stereo camera or other 3-D sensors) can result in increased robustness of the crop state classification step, but the system can also work without 3d information. The camera or cameras can be mounted either on the cab 38 or directly on the platform 18 with a field of view across at least some portion of the working width of the platform 18. The number of cameras and their physical orientation and optical properties can be chosen based on the working width of the combine harvester 10 and the maximal image pixel size on the ground, which still allows effective analysis and classification of the texture patterns existing in the image.

The sensor 48 acquires images of the area forward of the cab 38. The images are analyzed by the image processing (and classification) system 74, which determines the state of the crop and its orientation relative to the harvest direction (in case of downed crop) in the spatial area corresponding to the image area being analyzed. In an embodiment, a segmented 2d-map (or possibly 3d, to include the terrain contour) of the field in front of harvesting machine 10 can be provided and the segments filled with the mentioned information on the particular downed crop data for the segment. These segment data are used for controlling the actuators, as mentioned below. A multitude of such image locations is analyzed and classified. The image classification results can be aggregated using various statistical measures to produce aggregate estimates of the amount of downed crop, standing crop or stubble present at different distances from the machine in the forward direction, as well the dominating orientation of the detected downed crop. These aggregate estimates could for example represent percentages of the cutting width recognized as downed crop, the dominating downed crop orientation at a particular distance from the machine, geometric area estimates of the surface identified as downed crop, or direct maps representing the layout of the different detected classes. The classification based statistical measures can be enhanced with estimates of confidence of classification, to increase the overall robustness of the combine automation system.

The results produced based on the image analysis step are used by the electronic processing unit 90, which dynamically changes machine settings (actuators 58, 68, 98, 102, 70, 108, 110) to optimize performance given the crop conditions. Such a control system can either be predetermined based on combine domain knowledge, or it can be fully or partially learned or adjusted based on observing the strategies employed by the operator for adjusting machine settings (by considering operator inputs via the user input device 44) in downed crop conditions, as described in DE 10 2017 208 442 A1, the contents of which are incorporated herein by reference for all that it teaches.

An important component of the described automation system is the subsystem used for determining the status and orientation of crop ahead of the machine based on images captured by the sensor system. Given that the system needs to offer reliable classification in a variety of crop types and crop varieties, it needs to be easily adaptable and extendable. One way to achieve this adaptability is to use a learning based image classification system. For this purpose, one can generate a database of manually labeled images, where specific areas the images are marked as belonging to classes such as "standing crop", "downed crop lateral" or "downed crop towards", "downed crop away", "stubble", etc. This image database is used together with an optimization algorithm in order to determine mathematical relationships between the image pixel values and the output classifications which best match the manually generated labels.

The image classification system can use either "traditional learning systems" or the so-called "deep learning systems". The traditional learning systems are typically based on applying predetermined image feature extraction steps (e.g. HoG (histogram of oriented gradients), SIFT (scale invariant feature transform or LBP (local binary patterns) features) followed by a classification algorithm (e.g. neural network, decision tree, support vector machine, etc.) which is trained by optimizing it to produce the desired classification output. The deep learning systems (e.g. CNNs, convolutional neural networks) generally include the step of determining effective feature extractors as part of the overall classifier training process. As such, one can view deep learning based systems as offering the benefit of automatically determining effective feature extractors for the classification problem of interest, rather than requiring manual engineering of image feature extractors. The described reel automation system can be implemented with traditional and deep learning approaches.

In another embodiment, the image processing system 74 can identify in the images the single stalks and corresponding ears of the single plants of crop 76 based on their shape, and derive therefrom the direction of the crop.

Adjustment of Platform Parameters

The electronic processing unit 90 of the electronic control unit 46 will, if the second output signal 94 of the signal processing unit 86 indicates that there is mainly standing crop 76 (but no downed crop) to be harvested by the platform 18, instruct the actuators 58, 68 to position the reel 52 directly over the knife bar 50 and in horizontal direction such that the fingers 66 engage the ears of the crop 76. The reel speed is set such that crop is slightly accelerated into the platform 18. The image signals of sensor 48 can be monitored by the image processing system 74 and/or the signal processing unit 86 for crop back feeding over the reel 52, which would be responded by the electronic processing unit 90 with raising the reel until the back feeding stops in order to achieve proper finger engagement depth. In case that excessive shatter loss is seen in the images of sensor 48, the reel speed would be reduced and the reel height would be increased and the reel can be moved to the rear.

If it is seen in the images of sensor 48 that the material flow into the platform 18 after cutting is slowing down, the following measures would be taken in the mentioned order: the reel height would be lowered to avoid improper finger engagement depth to crop, the reel is shifted aft until normal feeding to header resumes, and the reel speed is increased to slightly accelerate crop into header. If it is seen in the images of sensor 48 that stalled material flow into the header occurs due to the knife bar 50 plugging, the reel is moved to lowest and back aft position and determine if the knife is cleared, the reel is speeded up if the stall is still not removed, while in the other case, previous reel position is resumed. If the stall is not cleared, operator intervention is required to stop, back up and clear the knife bar 50.

The electronic processing unit 90 of the electronic control unit 46 will, if the second output signal 94 of the signal processing unit 86 indicates that there is a significant amount of downed crop 76 to be harvested by the platform 18, proceed as follows. The propelling speed of the harvesting machine 10 is reduced if appreciable downed crop ahead of cut is expected in order to not overload header feeding. An appropriate distance or time before entering the area of downed crop, the reel 52 is extended forward and down ahead of the knife bar 50 to lift the downed crop. The full header width can be monitored for the following and address as described:

Slowing or stalled material flow into header: aft reel adjustment, lower reel adjustment, potentially faster reel speed, further slow ground speed, and if this is not sufficient, operator intervention is requested.

Uncut downed crop or long stubble length (preferably detected by another sensor looking to the field behind the platform or the harvesting machine): lower cut height, feederhouse aft adjustment for lower cut height.

Crop starting to drag on cutter bar (if the sensor 48 or another sensor can see the knife bar 50): Slower ground speed, aft reel adjustment, lower reel adjustment, faster reel speed, and (if not resolved) operator intervention is requested. After the operator has addressed the problem, the operator resumes automation.

The downed crop orientation determines the difficulty in gathering the crop 76. If the heads of the plants are leaning forward in the direction of travel, the reel 52 can pick up the crop very easily when the reel speed is ~120% of ground speed. Crop dividers help to collect the crop when the crop is lying to the side. When the heads (ears) of the crop 76 are lying towards the platform 18, this is the most difficult situation. The system would in this case lower the feederhouse assembly 20 to have the knife bar 50 as close to the ground as possible, and use actuator 98 (the position of which sensed by feedback sensor 104) to adjust the knife bar 50 parallel to the ground. If this would not suffice, a different harvest direction strategy for the field could be applied if there are significant downed crop portions (cf. US 2017/0082442 A1, the contents of which incorporated herein by reference).

In addition, if the system uses a 3D sensor 48 (like a stereo camera) which can estimate the height of crop 76, it is possible to adjust the cutting table length by actuator 102 (the position of which is sensed by feedback sensor 106 for control purposes) to the length-adjustable platform 18 at least approximately to the length of the cut crop, which length corresponds, as long as standing crop is to be harvested, to the difference between standing crop height and the cutting height (which can be automatically controlled by the electronic control unit 46 instructing the third actuator 70 to move the feederhouse assembly 20 and thus the platform 18 up and down around the axis 72 to a nominal value that can be input by the operator or be read from a map or be predetermined). The electronic control unit 46 can use, for the purpose of controlling actuator 102, the nominal cutting height or a feedback value provided by a cutting height sensor not shown in FIG. 1, but known in the art. In case the downed crop is oriented towards the combine, it is preferable to adjust the table length such that it is slightly longer than the (in this case horizontal, since the crop is lying on the ground) length of the cut crop in order to pull in the crop, but not to pull the roots out of the ground. In the opposite case where the crop is oriented away from the machine, one would use a shorter table length. As mentioned, for harvesting downed crop the electronic control unit 46 would use a relatively low cutting height over ground.

It should be noted that a number of modifications to the described embodiment can be made. The harvesting machine 10 can be, instead of a combine, a self-propelled or pulled windrower or forage harvester. The sensor 48 needs not to look (only) to the front of the harvesting machine 10, but could alternatively or additionally look to the side of the harvesting machine 10 and collect the described data already during harvesting a pass over the field adjacent the sensed area. It would also be possible to mount the sensor 48 on a drone or UAV and let it fly over the field before harvest.

We claim:

1. A system for controlling an operative parameter of a harvesting platform of an agricultural harvesting machine, comprising:
    a sensor adapted to provide downed crop information indicative of a characteristic of downed crop in a field to be harvested; and
    an electronic control unit adapted to control an operative parameter of at least one of a reel and a cutter bar table position of the harvesting platform based upon the downed crop information;
    wherein the electronic control unit is adapted to control at least one of cut height of the harvesting platform, platform fore-aft tilt and harvesting machine propelling speed based upon the downed crop information.

2. The system of claim 1, wherein the characteristic of the downed crop is at least one of an orientation of the downed crop and a magnitude of the downed crop.

3. The system of claim 1, wherein the operative parameter of the reel is at least one of vertical reel position, horizontal reel position and reel speed.

4. An agricultural harvesting machine comprising:
    a chassis;

ground engaging means supporting the chassis on the ground;

attachment means for adapting a harvesting platform on the chassis; and a system according to claim 1.

5. The harvesting machine according to claim 4, wherein the harvesting machine is one of a combine, a forage harvester and a windrower.

6. A system for controlling an operative parameter of a harvesting platform of an agricultural harvesting machine, comprising:

a sensor adapted to provide downed crop information indicative of a characteristic of downed crop in a field to be harvested; and an electronic control unit adapted to control an operative parameter of at least one of a reel and a cutter bar table position of the harvesting platform based upon the downed crop information;

wherein the electronic control unit is adapted to control the cutter bar table position of the harvesting platform in the case that the downed crop is directed towards the harvesting platform, to have a table length somewhat longer than a difference between a sensed crop height above ground and an actual cutting height of the harvesting platform, and in the case the downed crop is directed away from the harvesting platform, the table length is relatively short.

7. A system for controlling an operative parameter of a harvesting platform of an agricultural harvesting machine, comprising:

a sensor adapted to provide downed crop information indicative of a characteristic of downed crop in a field to be harvested; and an electronic control unit adapted to control an operative parameter of at least one of a reel and a cutter bar table position of the harvesting platform based upon the downed crop information;

wherein the sensor comprises at least two cameras together providing 3 dimensional image information of crop on the field and an image processing system.

8. The system of claim 7, wherein the sensor is connected to a learning-based image processing system, which is operable (a) in a learning mode in which it receives a sample image and human-generated classifications of image areas and learns a relation between the image and the classifications and (b) in an executive mode in which it applies the learned relation to one or more captured images.

9. A system for controlling an operative parameter of a harvesting platform of an agricultural harvesting machine, comprising:

a sensor adapted to provide downed crop information indicative of a characteristic of downed crop in a field to be harvested; and an electronic control unit adapted to control an operative parameter of at least one of a reel and a cutter bar table position of the harvesting platform based upon the downed crop information;

wherein the operative parameter of the reel is at least one of vertical reel position, horizontal reel position and reel speed, and the electronic control unit is adapted, when the sensor senses standing crop, to position the reel directly above a knife bar of the harvesting platform and in horizontal direction such that fingers of the reel engage ears of the standing crop and to set the reel speed such that crop is slightly accelerated into the harvesting platform.

10. A system for controlling an operative parameter of a harvesting platform of an agricultural harvesting machine, comprising:

a sensor adapted to provide downed crop information indicative of a characteristic of downed crop in a field to be harvested; and an electronic control unit adapted to control an operative parameter of at least one of a reel and a cutter bar table position of the harvesting platform based upon the downed crop information;

wherein the operative parameter of the reel is at least one of vertical reel position, horizontal reel position and reel speed, and the electronic control unit is adapted, when the sensor senses the downed crop, to move the reel forward and down ahead of a knife bar of the harvesting platform to lift the downed crop and to drive the reel with approximately 120% of ground speed if ears of the downed crop are leaning forward in a direction of travel, while if the ears of the downed crop are lying towards the harvesting platform, the knife bar of the harvesting platform is lowered and adjusted parallel to the ground.

11. A system for controlling an operative parameter of a harvesting platform of an agricultural harvesting machine, comprising:

a sensor adapted to provide downed crop information indicative of a characteristic of downed crop in a field to be harvested; and an electronic control unit adapted to control an operative parameter of at least one of a reel and a cutter bar table position of the harvesting platform based upon the downed crop information;

wherein the electronic control unit is adapted to control the cutter bar table position of the harvesting platform based on a sensed crop height above ground and an actual cutting height of the harvesting platform such that a distance between a knife bar and a transverse conveyor of the harvesting platform at least approximately corresponds to a difference between the sensed crop height above ground and an actual cutting height of the harvesting platform.

12. A system for controlling an operative parameter of a harvesting platform of an agricultural harvesting machine, comprising:

a sensor adapted to provide downed crop information indicative of a characteristic of downed crop in a field to be harvested; and an electronic control unit adapted to control an operative parameter of at least one of a reel and a cutter bar table position of the harvesting platform based upon the downed crop information;

wherein the harvesting platform has a frame, a knife bar, and a reel, and the sensor is adapted to provide the downed crop information indicative of an orientation of the downed crop, and the electronic control unit is connected to the sensor and is adapted to control at least one of vertical position, horizontal position and speed of the reel or a cutter bar table position corresponding to the horizontal position of the knife bar with respect to the frame of the platform based upon the downed crop information.

* * * * *